United States Patent Office 3,499,013
Patented Mar. 3, 1970

3,499,013
3-OXYGENATED 21β-HYDROCARBONSULFONYL-PREGNA-17(20),20-DIENES, DEHYDRO AND 19-NOR DERIVATIVES THEREOF AND INTERMEDIATES THERETO
Walter R. Benn, Deerfield, Ill., assignor to G. D. Searle & Co., Chicago, Ill., a corporation of Delaware
No Drawing. Continuation-in-part of application Ser. No. 666,481, Sept. 8, 1967. This application Nov. 4, 1968, Ser. No. 773,273
Int. Cl. C07c 169/34; A61k 17/06
U.S. Cl. 260—397.3                                15 Claims

ABSTRACT OF THE DISCLOSURE

The reaction of a 17α-ethynyl-17β-hydroxy steroid with a hydrocarbonsulfinyl halide affords the corresponding 17-hydrocarbonsulfinate ester which, upon heating, rearranges to yield a 21-hydrocarbonsulfonyl-17(20),20-allene. The latter compounds are useful pharmacological agents as is evidenced by their anti-inflammatory and antifungal properties.

---

This application is a continuation-in-part of my copending application Ser. No. 666,481, filed Sept. 8, 1967.

The present invention is concerned with novel steroidal chemical compounds characterized by a 21β-hydrocarbonsulfonyl-17(20),20-allenic structure and with novel compounds useful as intermediates in the production thereof. Those allenic compounds are, more particularly, described as 3-oxygenated 21β-hydrocarbonsulfonylpregna-17(20),20-dienes, dehydro and 19-nor derivatives thereof and are represented by the following structural formula

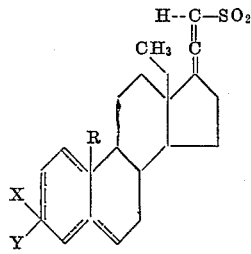

wherein R is hydrogen or methyl, R' is a lower alkyl or an aryl radical, X is an hydroxy, esterified or etherified hydroxy group and Y is hydrogen, or X and Y together comprise an oxo group, and the dotted lines indicate that the A and B rings are saturated or, alternatively, that a $\Delta^4$, $\Delta^5$ or $\Delta^{1,3,5(10)}$ unsaturated ring system is present.

Examples of the lower alkyl radicals represented in the foregoing structural representation are methyl, ethyl, propyl, butyl, pentyl, hexyl, heptyl and the branched-chain groups isomeric therewith.

The esterified hydroxy groups are typified by (lower alkanoyl)oxy radicals such as formyloxy, acetoxy, propionoxy, butyryloxy, valeryloxy, hexanoyloxy, heptanoyloxy and the branched-chain groups isomeric therewith.

Illustrative of the etherified hydroxy groups are lower alkoxy radicals such as methoxy, ethoxy, propoxy, butoxy, pentyloxy, hexyloxy, heptyloxy and the corresponding branched-chain radicals.

The aryl radicals encompassed by the R' term are exemplified by phenyl, tolyl and other substituted phenyl groups such as 2,4-dinitrophenyl.

An especially preferred embodiment of the present invention consists of the compounds of the following structural formula

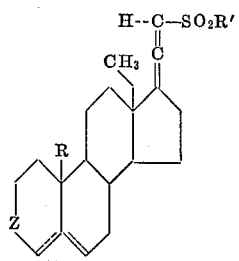

wherein R is hydrogen or methyl, R' is methyl or p-tolyl, the dotted lines indicate either a 4,5 or 5,6 double bond, Z is carbonyl when the double bond is at the 4,5-position and Z is β-(lower alkanoyl)oxymethylene when the double bond is at the 5,6 position and R is methyl.

The lower alkanoyl radicals denoted in the latter structural formula are as defined hereinbefore.

Starting materials suitable for the manufacture of the compounds of the present invention are those of the following structural formula

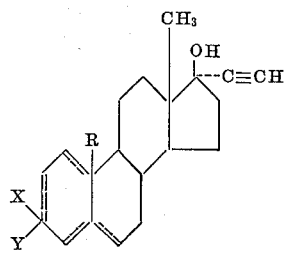

wherein R, X, Y and the dotted lines have the same meanings as indicated hereinbefore. Those materials are allowed to react with a hydrocarbonsulfinyl halide to afford the corresponding 17-hydrocarbonsulfinates. That process is specifically illustrated by the reaction of 17α-ethynyl-17β-hydroxyandrost-4-en-3-one in methylene chloride with p-toluenesulfinyl chloride and pyridine to afford 17α - ethynyl - 17β - hydroxyandrost - 4 - en - 3 - one 17-p-toluenesulfinate.

These novel sulfinate esters exist as mixtures of the two possible enantiomers and are conveniently designated as the R and S isomers in accordance with the system described by Cahn, Journal of Chemical Education, 41, 116 (1964). This type of stereoisomerism about the sulfur atom is represented by the following partial formulas

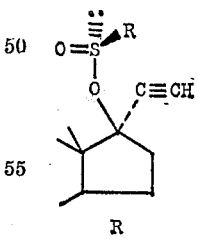 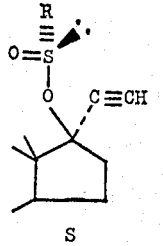

R                                  S

Heating of these intermediate sulfinate esters, preferably in a high boiling solvent, results in rearrangement to yield the instant 21β-hydrocarbonsulfonyl-17(20),20-allenes. The aforementioned 17α-ethynyl-17β-hydroxyandrost-4-en-3-one 17-p-toluenesulfinate is heated in refluxing chlorobenzene to produce 21β-p-tolylsulfonyl-pregna-4,17(20),20-trien-3-one. Other high boiling aromatic hydrocarbons such as xylene are likewise suitable as solvents in that process.

The 3-keto-$\Delta^4$ compounds of this invention are alternatively obtained from the corresponding 3-(lower alkanoyl)oxy-Δ⁵ substances by the successive processes of hydrolysis and oxidation. Typically, 21β-p-tolylsulfonylpregna-5,17(20),20-trien-3β-ol 3-acetate is contacted with dilute hydrochloric acid in ethanol, thus affording 21β-p-tolylsulfonylpregna-5,17(20),20-trien-3β-ol. Oxidation of that substance with aqueous chromic acid in acetone followed by reaction with sulfuric acid to effect conjugation of the double bond results in 21β-p-tolylsulfonylpregan-4,17(20),20-trien-3-one.

The 21β-hydrocarbonsulfonyl-17(20),20-allenes of this invention exhibit valuable pharmacological properties. They are, for example, anti-inflammatory and anti-fungal agents.

The anti-inflammatory property of the instant compounds is illustrated by the activity of 21β-methanesulfonylpregna-4,17(20),20-trien-3-one and 21β-methanesulfonyl-19-norpregna-4,17(20),20-trien-3-one when tested in the following assay:

Each of a group of 10 intact male rats weighing 100–130 g. is injected under the plantar surface of each hind foot with 0.1 ml. of 1% solution of carrageenin (Type 402, Marine Colloids, Inc.). The test compound, dissolved or suspendended in saline, corn oil or propylene glycol, is administered subcutaneously or intragastrically 1 hour prior to the carrageenin injection. The doses normally employed are 25 mg. per rat subcutaneously and 5 mg. per rate intragastrically. Another such group serving as controls is treated in an identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P<0.05$) in the swelling observed in control animals.

Illustrative of the anti-fungal property of the compounds of this invention is the actvity of 21β-methanesulfonylpregna-4,17(20),20-trien-3-one and 21β-methanesulfonyl-19-norpregna-4,17(20),20-trien-3-one when tested in the following assay:

The test compound is dissolved or suspended in melted Sabouraud agar and is held at 80° C. for 20 minutes. Dilutions are made from this preparation in melted Sabouraud agar in order to give concentrations of the test substance of 1000, 100, 10 and 1 mcg./ml. in the agar. The agar is permitted to cool and solidify and is then surface inoculated with a suspension of spores of *Trichophyton mentagrophytes*. The inoculated medium is incubated at room temperature (ca. 25 C.) for 6–7 days, at the end of which time the media are examined grossly for the presence or absence of growth of the test organism. Control preparations lacking the test compound are employed for comparative purposes. The activity of a test compound is reported as mcg. of the compound/ml. of agar which completely prevents visible growth of the test organism.

The invention will appear more fully from the examples which follow. These examples are given by way of illustration only and are not to be construed as limiting the invention either in spirit or in scope as many modifications both in materials and in methods will be apparent to those skilled in the art. Temperatures are given in degrees centigrade (° C.) and quantities of materials in parts by weight except where otherwise noted.

EXAMPLE 1

A solution containing 7.1 parts of 17α-ethynylandrost-5-ene-3β,17β-diol 3-acetate and 1.6 parts of pyridine in 267 parts of methylene chloride is cooled to approximately −10° and a solution of 3.5 parts of p-toluenesulfinyl chloride in 40 parts of methylene chloride is added with stirring over a period of about 30 minutes. The resulting reaction mixture is stirred for about 16 hours at a temperature between −10 and 5°, then is washed successively with water, saturated aqueous sodium bicarbonate, water and aqueous sodium chloride. The washed solution is dried over anhydrous sodium sulfate, then is concentrated under reduced pressure to afford a colorless oily residue. The latter material is triturated with ether in order to induce crystallization of the crude product. Recrystallization of that material from ether affords prism-like crystals of 17α-ethynylandrost-5-ene-3β,17β-diol 3-acetate, 17-p-toluenesulfinate, melting at about 143–150°. This compound exhibits infrared absorption maxima, in chloroform, at about 3.01, 5.78, 7.95, 8.82 and 9.70 microns and nuclear magnetic resonance peaks at about 51, 56, 63, 145.5, 177, 178.5, 276, 324 and 450 hertz. It is represented by the following structural formula.

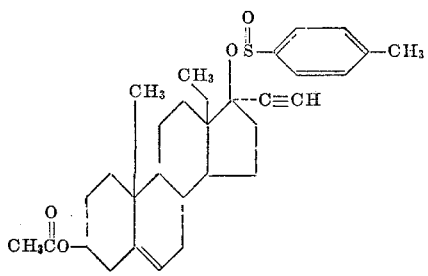

EXAMPLE 2

When an equivalent quantity of 17α-ethynylandrost-5-ene-3β, 17β-diol 3-propionate is substituted in the procedure of Example 1, there is produced 17α-ethynylandrost-5-ene-3β, 17β-diol 3-propionate, 17-p-toluenesulfinate.

EXAMPLE 3

To a chilled solution of 2 parts of methanesulfinyl chloride in 27 parts of methylene chloride is added with stirring and cooling a solution of 4.5 parts of 17α-ethynylandrost-5-ene-3β,17β-diol 3-acetate and 1 part of pyridine in 100 parts of methylene chloride. Stirring is continued while the mixture is allowed to warm to room temperature, then for about 2 hours longer. Dilution with approximately 400 parts of methylene chloride affords an organic solution, which is washed successively with water, aqueous sodium bicarbonate, water and aqueous sodium chloride, then dried over anhydrous sodium sulfate and evaporated to dryness under reduced pressure. The remaining crystalline solid is 17α-ethynylandrost-5-ene-3β, 17β-diol 3-acetate, 17-methanesulfinate, which melts at about 155–165°. It displays infrared absorption maxima at about 2.75, 3.03, 5.78, 7.95, 8.50 and 8.82 microns and nuclear magnetic resonance peaks at about 55, 62.5, 122, 160, 172, 275 and 324 hertz. This compound is represented by the following structural formula

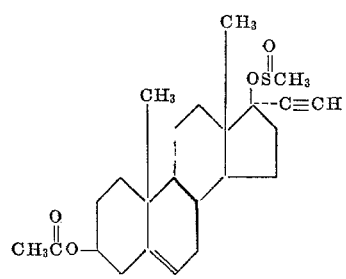

EXAMPLE 4

A solution containing 13.9 parts of 17α-ethynyl-5α-androstane-3β,17β-diol 3-acetate, 20 parts of pyridine and 267 parts of methylene chloride is cooled by means of an ice-salt bath and 10.5 parts of p-toluenesulfinyl chloride is added dropwise with stirring over a period of about 30 minutes. Stirring of the mixture at that temperature is continued for about 6 hours, at the end of which time it is diluted with methylene chloride. The resulting organic solution is washed successively with cold dilute hydrochloric acid, water, cold dilute aqueous sodium bicarbonate and saturated aqueous sodium chloride, then is dried over anhydrous sodium sulfate and concentrated under reduced pressure to afford a pale yellow solid residue. Purification of that crude product by recrystallization from ethyl acetate-hexane affords pure 17α-ethynyl-5α-androstane-3β,17β-diol 3-acetate, 17-p-toluenesulfinate, melting at about 161–165°. This compound exhibits infrared absorption peaks at about 3.00, 5.78, 7.95 and 8.82 microns and nuclear magnetic resonance maxima at about 49.5, 53, 121, 145, 176.5, 178.5, 281 and 447 hertz.

EXAMPLE 5

To a solution of 6.25 parts of 17α-ethynyl-17β-hydroxyandrost-4-en-3-one and 20 parts of pyridine in 333 parts of methylene chloride, cooled by means of an ice-salt bath, is added, dropwise with cooling and stirring over a period of about 2 hours, 3.84 parts of p-toluenesulfinyl chloride. The resulting reaction mixture is stored at approximately 4° for about 20 hours, then is washed successively with cold dilute hydrochloric acid, cold dilute aqueous sodium bicarbonate and saturated aqueous sodium chloride. The washed solution is then dried over anhydrous sodium sulfate and stripped of solvent by distillation under reduced pressure. The remaining white crystalline crude product is purified by recrystallization from ether to afford pure 17α-ethynyl-17β-hydroxyandrost-4-en-3-one 17-p-toluenesulfinate, which displays a double melting point at about 147–152° and 195–205°. Infrared absorption peaks are observed at about 3.02, 6.00, 6.19, 6.25, 8.75 and 9.23 microns and nuclear magnetic resonance peaks at about 52, 57.5, 71.5, 145, 176, 178, 345 and 449 hertz. This compound is represented by the following structural formula

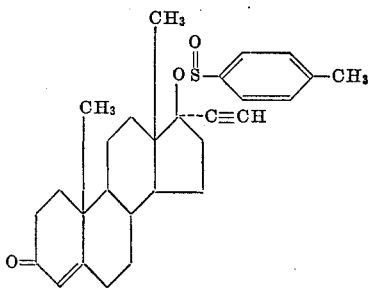

EXAMPLE 6

To a slurry of 25 parts of 17α-ethynyl-17β-hydroxyandrost-4-en-3-one and 25 parts of pyridine with 1,067 parts of methylene chloride is added, over a period of about 3 minutes with stirring, a solution of 9.9 parts of methanesulfinyl chloride in 27 parts of methylene chloride. The resulting reaction mixture is stirred at room temperature for about 3 hours, then is washed successively with cold dilute hydrochloric acid, water, saturated aqueous sodium bicarbonate and saturated aqueous sodium chloride. Drying of that solution over anhydrous sodium sulfate followed by removal of the solvent by distillation under reduced pressure affords a gummy solid residue. Purification of that material by recrystallization from acetone affords prism-like crystals of pure 17α-ethynyl-17β-hydroxyandrost-4-en-3-one 17-methanesulfinate, melting at about 165–175° with decomposition. It is represented by the following structural formula

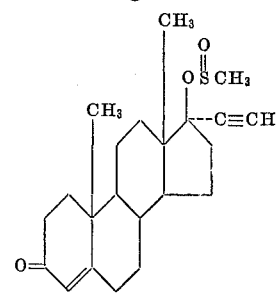

EXAMPLE 7

To a solution of 14.9 parts of 17α-ethynyl-17β-hydroxyestr-4-en-3-one and 20 parts of pyridine in 333 parts of methylene chloride, cooled by means of an ice-salt bath, is added, over a period of about 2 hours with cooling and stirring, 8.7 parts of p-toluenesulfinyl chloride. After the addition is complete, the reaction mixture is stirred at aproximately 4° for about 18 hours, then is washed successively with cold dilute hydrochloric acid, cold dilute aqueous sodium bicarbonate and saturated aqueous sodium chloride. Distillation of the solvent under reduced pressure affords the residual crude product, which is purified by recrystallization from ether to afford pure 17α-ethynyl-17β-hydroxyestr-4-en-3-one 17-p-toluenesulfinate, melting at about 161–167°. This compound exhibits infrared absorption maxima at about 3.00, 5.97, 6.15, 8.81, 8.96, 10.00 and 10.40 microns and also nuclear magnetic resonance peaks at about 53, 57.5, 145, 175, 349.5 and 447 hertz. It is represented by the following structural formula

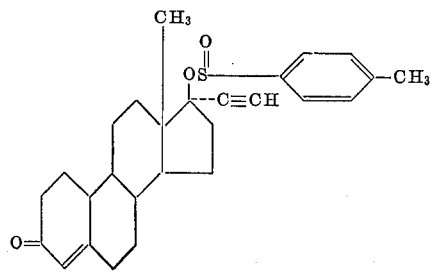

EXAMPLE 8

To a solution containing 23.8 parts of 17α-ethynyl-17β-hydroxyestr-4-en-3-one, 2 parts of pyridine and 1,067 parts of methylene chloride is added 9.9 parts of methanesulfinyl chloride and the resulting reaction mixture is stirred at room temperature for about 3 hours. At the end of that reaction time, the mixture is washed successively with cold dilute hydrochloric acid, water, saturated aqueous sodium bicarbonate and saturated aqueous sodium chloride. Drying over anhydrous sodium sulfate followed by distillation of the solvent under reduced pressure affords crystalline 17α-ethynyl-17β-hydroxyestr-4-en-3-one 17-methanesulfinate, characterized by infrared absorption peaks at about 3.02, 6.00, 6.17 and 8.80 microns. It is represented by the following structural formula

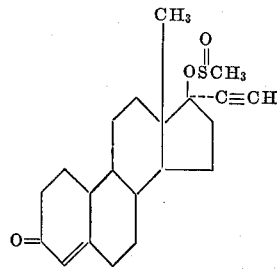

EXAMPLE 9

A solution containing 7.8 parts of 17α-ethynylestra-1,3,5(10)-triene-3,17β-diol 3-methyl ether, 10 parts of pyridine and 333 parts of methylene chloride is cooled by means of an ice-salt bath and 4.83 parts of p-toluenesulfinyl chloride is added with stirring over a period of about 15 minutes. The reaction mixture is stored at approximately 4° for about 18 hours, then is washed successively with cold dilute hydrochloric acid, cold dilute aqueous sodium bicarbonate and saturated aqueous sodium chloride. The organic solution is then dried over anhydrous sodium sulfate and stripped of solvent by distillation under reduced pressure to afford 17α-ethynylestra-1,3,5(10)-triene-3,17β-(diol 3-methyl ether, 17-p-toluenesulfinate as a colorless glass. This compound exhibits infrared absorption maxima at about 3.01, 6.21, 6.65, 8.89, 9.00 and 10.39 microns and also nuclear magnetic resonance peaks at about 53.5, 56.5, 145, 177, 179 226 and a multiplet at 399–465 hertz.

EXAMPLE 10

A solution containing 17 parts of 17α-ethynylestra-1,3,-5(10)-triene-3,17β-diol 3-acetate, 7.9 parts of pyridine and 667 parts of methylene chloride is cooled by means of a Dry Ice-acetone bath and 9.65 parts of p-toluenesulfinyl chloride is tadded with stirring over a period of about 10 minutes. The reaction mixture is stirred at that temperature for about 4 hours, then is allowed to warm to a temperature of approximately 4° over a period of about 16 hours. At the end of that time, the mixture is washed successively with cold dilute hydrochloric acid, water, cold dilute aqueous sodium carbonate, water and saturated aqueous sodium chloride, then is dried over anhydrous sodium sulfate and distilled to dryness under reduced pressure. The resulting solid residue is purified by recrystalization from acetone-hexane to yield pure 17α-ethynyl-estra-1,3,5(10)-triene-3,17β-diol 3-acetate, 17-p-toluenesulfinate, melting at about 151–154°. This compound exhibits infrared absorption peaks at about 3.02, 5.70, 6.25, 6.68, 7.28, 8.10, 8.85, 9.85 and 10.40 microns and nuclear magnetic resonance peaks at about 52, 57, 136, 145.5, 180, 425 and 450.5 hertz.

EXAMPLE 11

A solution of 17α-ethynylandrost-5-ene-3β,17β-diol 3-acetate, 17-p-toluenesulfinate in 220 parts of chlorobenzene is heated at the reflux temperature in an atmosphere of nitrogen for about 45 minutes, at the end of which time the solvent is removed by distillation under reduced pressure. The residual materal is purified by recrystallization from acetone-hexane to afford prism-like crystals of 21β-p-tolylsulfonylpregna-5,17(20),20-trien-3β-ol 3 - acetate, melting at about 174–176°. This compound exhibits an ultraviolet absorption maximum at about 235 millimicrons with a molecular extinction coefficient of about 18,250 and also infrared absorption peaks at about 5.10, 5.79, 7.95, 8.74, 9.22 and 9.70 microns. Nuclear magnetic resonance maxima are observed at about 54, 62.5, 121.5, 147, 276, 324, 375.5 and 455 hertz. This compound is represented by the following structural formula

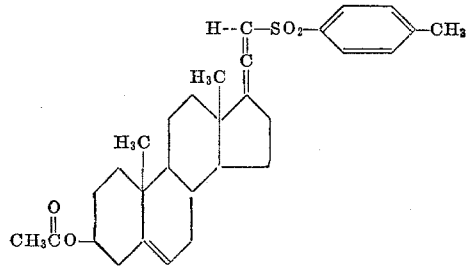

EXAMPLE 12

When an equivalent quantity of 17α-ethynylandrost-5-ene-3β,17β-diol 3-propionate, 17-p-toluenesulfinate is substituted in the procedure of Example 11, there is produced 21β-p-tolylsulfonylpregna - 5,17(20),20-trien-3β-ol 3-propionate.

EXAMPLE 13

A solution containing 5.28 parts of 17α-ethynylandrost-5-ene-3β,17β-diol 3-acetate, 17-methanesulfinate dissolved in 165 parts of chlorobenzene is heated at the reflux temperature under nitrogen for about 3 hours, then is concentrated to dryness under reduced pressure to afford a tan solid residue. Recrystallization of that crude product from either ethyl acetate or acetone affords pure 21β-methanesulfonylpregna - 5,17(20),20-trien-3β-ol 3-acetate as platelet-like crystals, melting at about 191–194° and exhibiting an optical rotation of +96°. Nuclear magnetic resonance peaks are observed at about 63, 122, 179.5, 277, 323 and 374 hertz and infrared absorption maxima at about 5.10, 5.78, 7.59, 7.95, 8.71, 9.70 and 10.41 microns. This compound is represented by the following structural formula

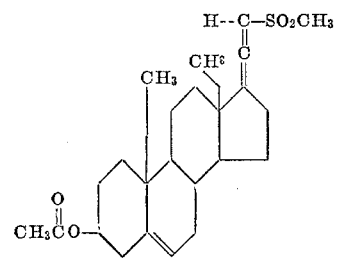

EXAMPLE 14

A solution containing 23 parts of 17α - ethynyl-5α-androstane - 3β,17β-diol 3-acetate, 17-p-toluenesulfinate and 880 parts of chlorobenzene is heated at the reflux temperature in a nitrogen atmosphere for about 45 minutes, then is concentrated to dryness under reduced pressure. The resulting crude product is purified by recrystallization from acetone to afford dense prism-like crystals of 21β-p-tolylsulfonyl-5α-pregna-17(20),20 - dien-3β-ol 3-acetate, melting at about 191–197°. Nuclear magnetic resonance peaks are observed at about 50, 52.5, 146.5, 282, 374 and 450 hertz, infrared absorption maxima at about 5.11, 5.72, 6.19, 7.53, 7.95, 8.70, 9.19 and 9.72 microns and an ultraviolet absorption maximum at about 236 millimicrons with a molecular extinction coefficient of about 17,900.

EXAMPLE 15

A mixture containing 1 part of 21β-p-tolylsulfonyl-5α-pregna-17(20),20-dien-3β-ol 3-acetate, 0.6 part of concentrated hydrochloric acid, 40 parts of ethanol and 5 parts of water is stored at room temperature for about 16 hours, then is carefully diluted with water. The resulting precipitated product is isolated by filtration and dried, then purified by recrystallization from methyl-cyclohexane-acetone to afford 21β-p-tolylsulfonyl-5α-pregna-17(20),20-dien-3β-ol, melting at about 165–170° and characterized by infrared absorption maxima, in chloroform, at about 2.75, 5.10, 6.25, 7.58, 8.75, 9.23 and 9.68 microns.

EXAMPLE 16

A solution containing 8.3 parts of 17α-ethynyl-17β-hydroxyandrost-4-en-3-one 17 - p-toluenesulfinate and 220 parts of chlorobenzene is heated at the reflux temperature in a nitrogen atmosphere for about 30 minutes, then is concentrated to dryness under reduced pressure, thus affording a pale yellow solid residue. That crude product is purified by recrystallization from acetone to afford pure 21β - p-tolylsulfonylpregna - 4,17(20),20-trien-3-one as prism-like crystals, melting at about 196–200° and exhibiting an optical rotation of +321°. An ultraviolet absorption maximum is observed at about 237.8 millimicrons with a molecular extinction coefficient of about 36,500. This compound exhibits also nuclear magnetic resonance peaks at about 56.5, 72, 147, 345, 376 and 456 hertz and infrared absorption maxima at about 5.09, 5.99, 6.18, 6.24, 7.56, 8.73 and 9.22 microns. It is represented by the following structural formula

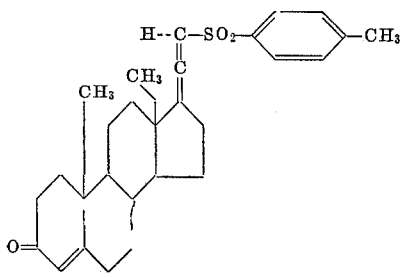

EXAMPLE 17

A solution of 29 parts of 17α-ethynyl-17β-hydroxy-androst-4-en-3-one 17-methanesulfinate in 550 parts of chlorobenzene is heated at the reflux temperature for about 30 minutes, then is concentrated to dryness under reduced pressure. The resulting brown solid residue is purified by recrystallization from acetone to afford pure 21β - methanesulfonylpregna - 4,17(20),20-trien-3-one, melting at about 188–193°. This compound exhibits an optical rotation of +336° and ultraviolet absorption maximum at about 240 millimicrons with a molecular extinction coefficient of about 17,700 and also infrared absorption peaks at about 5.10, 6.00, 6.19, 7.60, 8.83 and 10.42 microns. Nuclear magnetic resonance maxima are observed at about 65, 73, 179, 344 and 372.5 hertz. This compound is represented by the following structural formula

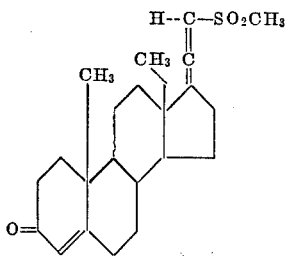

EXAMPLE 18

A solution of 21.3 parts of 17α-ethynyl-17β-hydroxy-estr-4-en-3-one 17-p-toluenesulfinate in 220 parts of chlorobenzene is heated at the reflux temperature under nitrogen for about 45 minutes, then is concentrated under reduced pressure to afford a light amber-colored solid residue. That material is recrystallized from acetone-hexane, thus affording prism-like crystals of 21β-p-tolylsulfonyl-19-norpregna-4,17(20),20-trien-3-one, melting at about 176–179°. This compound is further characterized by an optical rotation of +244°, by an ultraviolet absorption maximum at about 237.8 millimicrons with a molecular extinction coefficient of about 36,400 and by nuclear magnetic resonance peaks at about 58, 147.5, 351.5, 376 and 456 hertz. Infrared absorption maxima are observed at about 5.11, 6.01, 6.19, 6.26, 7.60, 8.75 and 9.25 microns. This compound is represented by the following structural formula

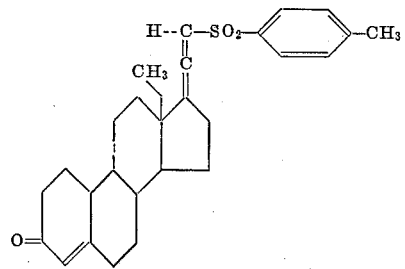

EXAMPLE 19

A solution containing 28 parts of 17α-ethynyl-17β-hydroxyestr-4-en-3-one 17-methanesulfinate and 550 parts of chlorobenzene is heated under reflux for about 30 minutes, then is concentrated to dryness under reduced pressure. The crude product thus obtained is purified by chromatography on silica gel followed by elution with 30% ethyl acetate in benzene. The fraction obtained from the eluate is further purified by recrystallization from acetone to afford prism-like crystals of 21β-methanesulfonyl-19-norpregna-4,17(20),20-trien-3-one, melting at about 187–192°. This compound displays an optical rotation of +240° and ultraviolet absorption maxima at about 239.5 and 220 millimicrons with molecular extinction coefficients of about 16,500 and 9200, respectively. Infrared absorption peaks are observed at about 5.11, 6.00, 6.18, 7.60, 8.83 and 10.42 microns and nuclear magnetic resonance peaks at about 66, 179, 351 and 374 hertz. This compound is represented by the following structural formula

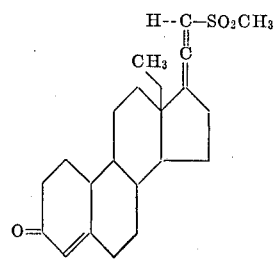

EXAMPLE 20

A solution containing 17α-ethynylestra-1,3,5(10)-triene-3,17β-diol 3-methyl ether, 17-p-toluenesulfinate and 220 parts of chlorobenzene is heated at the reflux temperature for about 30 minutes, then is concentrated to dryness under reduced pressure. The resulting solid residue is purified by recrystallization from ether to afford prism-like crystals of 21β-p-tolylsulfonyl-19-norpregna-1,3,5(10),17(20),20-pentaen-3-ol 3-methyl ether, melting at about 141–143°. This compound displays an optical rotation of +165° and an ultraviolet absorption maximum at about 231.5 millimicrons with a molecular extinction coefficient of about 21,800. Nuclear magnetic resonance peaks are observed at about 55, 146.5, 225, 376, 398, 418 and 455 hertz and infrared absorption maxima at about 5.10, 6.22, 6.35, 6.65, 7.59, 7.65, 7.75, 8.75 and 9.23 microns.

EXAMPLE 21

A solution of 23 parts of 17α-ethynylestra-1,3,5(10)-triene-3,17β-diol 3-acetate, 17-p-toluenesulfinate and 770 parts of chlorobenzene is heated at the reflux temperature under nitrogen for about 45 minutes, then is concentrated to dryness under reduced pressure to afford, as a glass, 21β-p-tolylsulfonyl - 19 - norpregna-1,3,5(10),17(20),20-pentaen-3-ol 3-acetate. This compound displays infrared absorption maxima at about 5.10, 5.70, 6.25, 6.68, 7.58. 7.65, 8.10, 8.73, 9.23 and 9.84 microns and nuclear magnetic resonance peaks at about 55, 136, 147, 378, 424 and 456 hertz.

EXAMPLE 22

A solution containing 23 parts of 21β-p-tolylsulfonyl-19 - norpregna-1,3,5(10),17,(20),20-pentaen-3-ol 3-acetate, 21 parts of acetic acid, 80 parts of methanol and 5 parts of water is distilled slowly over a period of about 3 hours, during which time the volume is maintained by the periodic addition of methanol. At the end of that reaction period, the solvents are removed by distillation under reduced pressure and the resulting residue is extracted with ether. The ether solution is washed successively with dilute aqueous sodium bicarbonate, water and saturated aqueous sodium chloride, then is dried over anhydrous sodium sulfate. The dried solution is concentrated to dryness under reduced pressure and the crude product thus obtained is purified by recrystallization from ether-hexane, then from ethyl acetate-methylcyclohexane to yield needle-like crystals of 21β-p-tolylsulfonyl-19-norpregna-1,3,5(10),17(20),20-pentaen-3-ol, melting at about 192.5–194°. Nuclear magnetic resonance peaks are observed at about 53.5, 145.5, 340.5, 376.5, 412 and 454 hertz and infrared absorption peaks at about 2.78, 3.11, 5.10, 6.64, 7.59, 7.65, 7.75, 8.73 and 9.23 microns.

EXAMPLE 23

The hydrolysis of an equivalent quantity of 21-β-p-tolylsulfonylpregna-5,17(20),20-trien-3β-ol 3-acetate according to the procedure described in Example 15 results in 21β-p-tolylsulfonylpregna-5,17(20),20-trien-3β-ol.

To a solution of 4.54 parts of 21β-p-tolylsulfonyl-pregna-5,17(20),20-trien-3β-ol in 320 parts of acetone is added, at 0–5°, 2.5 parts by volume of an aqueous solution, 8 N in chromium trioxide and 8 N in sulfuric acid. After approximately 5 minutes, the reaction mixture is diluted with about 1500 parts of water and the resulting crystalline precipitate is collected by filtration, washed on the filter with water and dried. That material is then dissolved in 40 parts of ethanol and approximately 0.25 part of 10 N sulfuric acid is added. The resulting mixture is heated on the steam bath for about 5 minutes, then is diluted with water and the aqueous mixture thus obtained is extracted with ether. The ether solution is washed successively with water, dilute aqueous sodium bicarbonate, water and saturated aqueous sodium chloride, then is dried over anhydrous sodium sulfate and stripped of solvent under reduced pressure to afford 21β-p-tolylsulfonylpregna-4,17-(20),20-trien-3-one, identical with the product of Example 16.

What is claimed is:

1. A compound of the formula

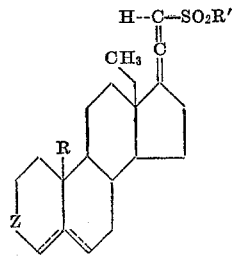

wherein R is selected from the group consisting of hydrogen and methyl, R' is selected from the group consisting of methyl and p-tolyl, the dotted lines indicate a double bond at either the 4,5 or 5,6 position, Z is carbonyl when the 4,5 linkage is a double bond and Z is β-(lower alkanoyl)oxymethylene when the 5,6 linkage is a double bond and R is methyl.

2. As in claim 1, a compound of the formula

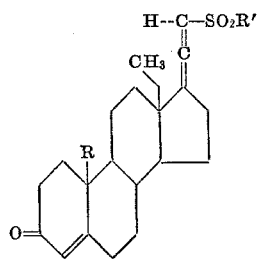

wherein R is selected from the group consisting of hydrogen and methyl and R' is a member of the class consisting of methyl and p-tolyl.

3. As in claim 1, a compound of the formula

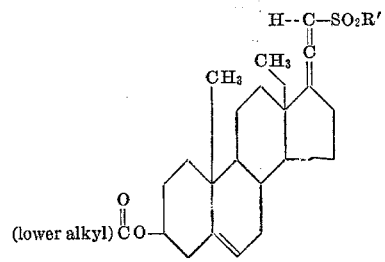

wherein R' is selected from the group consisting of methyl and p-tolyl.

4. As in claim 1, a compound of the formula

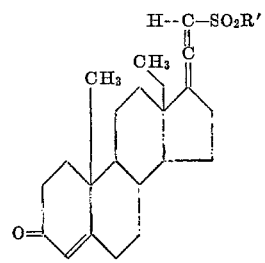

wherein R' is a member of the class consisting of methyl and p-tolyl.

5. As in claim 1, a compound of the formula

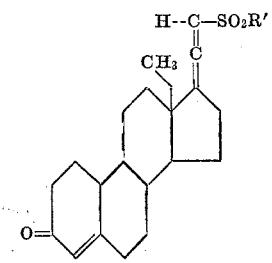

wherein R' is a member of the class consisting of methyl and p-tolyl.

6. A compound according to claim 1, wherein R and R' are methyl, the 4,5 linkage is a double bond and Z is carbonyl, that compound being 21β-methanesulfonyl-pregna-4,17(20),20-trien-3-one.

7. A compound according to claim 1, wherein R is hydrogen, R' is methyl, the 4,5 linkage is a double bond and Z is carbonyl, that compound being 21β-methane-sulfonyl-19-norpregna-4,17(20),20-trien-3-one.

8. A compound according to claim 1, wherein R is methyl, R' is p-tolyl, the 4,5 linkage is a double bond and Z is carbonyl, that compound being 21β-p-tolylsulfonylpregna-4,17(20),20-trien-3-one.

9. A compound according to claim 1, wherein R is hydrogen, R' is p-tolyl, the 4,5 linkage is a double bond and Z is carbonyl, that compound being 21β-p-tolyl-sulfonyl-19-norpregna-4,17(20),20-trien-3-one.

10. A compound according to claim 1, wherein R and R' are methyl, the 5,6 linkage is a double bond and Z is β-acetoxymethylene, that compound being 21β-methansulfonylpregna-5,17(20),20-trien-3β-ol 3-acetate.

11. A compound according to claim 1, wherein R is methyl, R' is p-tolyl, the 5,6 linkage is a double bond and Z is β-acetoxymethylene, that compound being 21β-p-tolylsulfonylpregna-5,17(20),20-trien-3β-ol 3-acetate.

12. A compound of the formula

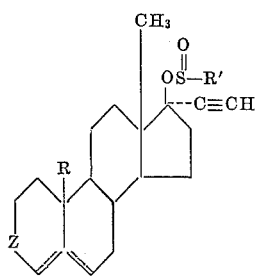

wherein R is selected from the group consisting of hydrogen and methyl, R' is selected from the group consisting of methyl and p-tolyl, the dotted lines indicate a double bond at either the 4,5 or 5,6 position, Z is carbonyl when the 4,5 linkage is a double bond and Z is β-(lower alkanoyl)oxymethylene when the 5,6 linkage is a double bond and R is methyl.

13. A compound according to claim 12, wherein R is methyl, R' is p-tolyl, the 5,6 linkage is a double bond and Z is β-acetoxymethylene, that compound being 17α-ethynylandrost-5-ene-3β,17β-diol 3-acetate, 17-p-toluenesulfinate.

14. A compound according to claim 12, wherein R is methyl, R' is p-tolyl, the 4,5 linkage is a double bond and Z is carbonyl, that compound being 17α-ethynyl-17β-hydroxyandrost-4-en-3-one 17-p-toluenesulfinate.

15. A compound according to claim 12, wherein R is hydrogen, R' is p-tolyl, the 4,5 linkage is a double bond and Z is carbonyl, that compound being 17α-ethynyl-17β-hydroxyester-4-en-3-one 17-p-toluenesulfinate.

References Cited

UNITED STATES PATENTS 3,032,563   5/1962   Muller et al. _____ 260—397.3
3,109,850  11/1963   Wettstein et al. ____ 260—397.5

OTHER REFERENCES

Joseph et al.: Steroids, June 1966, pp. 577–587.

LEWIS GOTTS, Primary Examiner
ETHEL G. LOVE, Assistant Examiner

U.S. Cl. X.R.

260—397.4, 397.5; 424—238, 242, 243

UNITED STATES PATENT OFFICE
CERTIFICATE OF CORRECTION

Patent No. 3,499,013  Dated March 3, 1970

Inventor(s) Walter R. Benn

It is certified that error appears in the above-identified patent and that said Letters Patent are hereby corrected as shown below:

Column 1, that portion of the formula reading

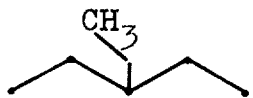   should read   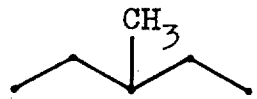

Column 2, that portion of the first formula reading

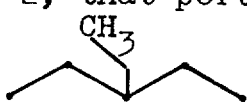   should read   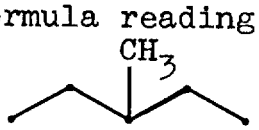

Column 3, line 8, "tolylsulfonylpregan-" should read -- tolylsulfonylpregna- --. Column 3, line 27, "per rate" should read -- per rat --. Column 3, line 51, "(ca. 25 C.)" should read -- (ca. 25° C.) --.

Column 4, that portion of the first formula reading

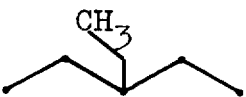   should read   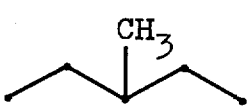

Column 6, line 48, "2 parts of pyridine" should read -- 25 parts of pyridine --.

Column 8, that portion of the formula reading

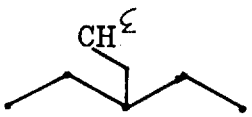   should read   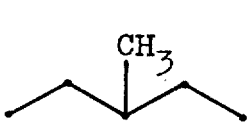

UNITED STATES PATENT OFFICE
CERTIFICATE OF CORRECTION

Patent No. 3,499,013  Dated March 3, 1970

Inventor(s) Walter R. Benn

It is certified that error appears in the above-identified patent and that said Letters Patent are hereby corrected as shown below:

Column 9, that portion of <u>all three formulas</u> reading

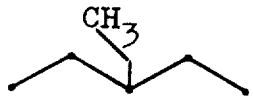 should read 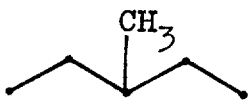

Column 10, that portion of the formula reading

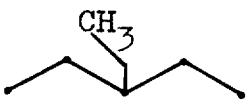 should read 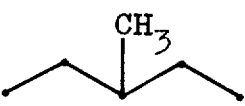

Column 11, that portion of <u>both formulas</u> reading

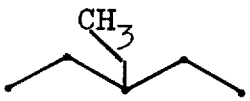 should read 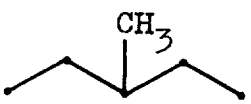

Column 12, that portion of <u>all three formulas</u> reading

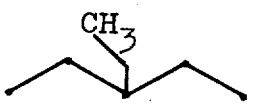 should read 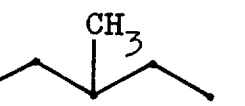

SIGNED AND SEALED
AUG 4 - 1970

(SEAL)
Attest:

Edward M. Fletcher, Jr.
Attesting Officer

WILLIAM E. SCHUYLER, JR.
Commissioner of Patents